United States Patent [19]

Kobayashi et al.

[11] 4,239,878

[45] Dec. 16, 1980

[54] PROCESS FOR PREPARING CATIONIC ELECTRODEPOSITION-COATING RESIN USING MONOFUNCTIONAL BLOCKING AGENTS AND TERTIARY AMINES HAVING AT LEAST TWO HYDROXY GROUPS

[75] Inventors: Yoshimichi Kobayashi, Yokohama; Yukio Tsuge, Kawasaki; Susumu Hirako, Yokohama, all of Japan

[73] Assignee: Mitsubishi Chemical Industries Ltd., Tokyo, Japan

[21] Appl. No.: 37,891

[22] Filed: May 10, 1979

[30] Foreign Application Priority Data

May 26, 1978 [JP] Japan .................................. 53/63138

[51] Int. Cl.$^3$ ........................ C08G 18/12; C08G 18/80
[52] U.S. Cl. .................................. 528/45; 528/60; 528/65; 528/66; 528/71; 528/77; 528/78; 528/81; 528/82; 528/904
[58] Field of Search ...................... 528/45, 60, 65, 66, 528/71, 78, 77, 81, 82, 904

[56] References Cited

U.S. PATENT DOCUMENTS

| | | | |
|---|---|---|---|
| 3,823,118 | 7/1974 | Matsunaga et al. | 528/45 |
| 3,883,483 | 5/1975 | Anderson et al. | 528/45 |
| 4,147,676 | 4/1979 | Pampouchidis et al. | 528/45 |

*Primary Examiner*—Maurice J. Welsh
*Attorney, Agent, or Firm*—Oblon, Fisher, Spivak, McClelland & Maier

[57] ABSTRACT

A cationic electrodeposition-coating resin is prepared by reacting
(1) a polyisocyanate with
(2) a polyol and
(3) a monofunctional blocking agent at a molar ratio of excess of isocyanate groups to total of hydroxyl groups of the polyol and functional groups of the monofunctional blocking agent to obtain an intermediate (A) having isocyanate groups; and reacting a tertiary amine having at least two hydroxyl groups with the intermediate (A) at a molar ratio of excess of hydroxyl groups of the tertiary amine to isocyanate groups of the intermediate (A); and cationizing the resulting reaction product (B).

11 Claims, No Drawings

PROCESS FOR PREPARING CATIONIC ELECTRODEPOSITION-COATING RESIN USING MONOFUNCTIONAL BLOCKING AGENTS AND TERTIARY AMINES HAVING AT LEAST TWO HYDROXY GROUPS

BACKGROUND OF THE INVENTION

1. Field of the Invention

The present invention relates to a process for preparing a cationic electrodeposition-coating resin.

2. Description of the Prior Arts

An electrodeposition process by using a water soluble resin or a water dispersible resin has been developed for a base coating (the first prime coat) on a car. Novel resins have been further developed for the purpose of improvement of anticorrosive property. However, it has not attained to provide a satisfactory resin.

In the conventional anionic electrodeposition process, a metal substrate is connected to an anode whereby the metal substrate and the pretreated layer thereof are dissolved. The anticorrosive property thereof has not been satisfactory.

It has been proposed to provide a cationic electrodeposition-coating resin and process which do not cause dissolution of a metal substrate. However, resins produced hitherto are hardly, practically applicable in view of an anticorrosive property, a mechanical property and a stability for storing as a coating composition.

The inventors have studied on electrodeposition processes which have not the above-mentioned disadvantages. It has been found to overcome these disadvantages by a cationic electrodeposition by using a paint comprising thermosettable cationic aqueous urethane resin. These inventions have been disclosed in U.S. Pat. No. 3,823,118, and Japanese Patent Publication Nos. 47519/1977, 47520/1977, 6663/1978, 2894/1978 and 2895/1978.

The inventors have further studied to improve the characteristics of the cationic electrodeposition process.

SUMMARY OF THE INVENTION

It is an object of the present invention to provide a process for preparing a cationic electrodeposition-coating resin especially a thermosettable cationic aqueous urethane resin which imparts improved characteristics, anticorrosive property and moisture resistant property to the coated layer.

It is another object of the present invention to provide a cationic electrodeposition-coating resin which imparts excellent characteristics to the coated layer by producing in different ways of reactions from those of the conventional processes.

The foregoing and other objects of the present invention have been attained by providing a process for preparing a cationic electrodeposition-coating resin by reacting (1) a polyisocyanate with
(2) a polyol and
(3) a monofunctional blocking agent at a molar ratio of excess of isocyanate groups to total of hydroxyl groups of the polyol and functional groups of the monofunctional blocking agent to obtain an intermediate (A) having isocyanate groups; and reacting a tertiary amine having at least two hydroxyl groups with the intermediate (A) at a molar ratio of excess of hydroxyl groups of the tertiary amine to isocyanate groups of the intermediate (A); and cationizing the resulting reaction product (B).

DETAILED DESCRIPTION OF THE PREFERRED EMBODIMENTS

The word "equivalent" in the specification means as follows. The equivalent is based on isocyanate group for the polyisocyanate. The equivalent is based on a functional group having an active hydrogen for a compound having an active hydrogen measured by Zerewitinoff-method such as the polyol and the monofunctional blocking agent.

Thus, one equivalent of the polyisocyanate is given by dividing the molecular weight (or average molecular weight) of the polyisocyanate by numbers of isocyanate groups in one molecule. One equivalent of the polyol is given by dividing the molecular weight (or average molecular weight) of the polyol by numbers of hydroxyl groups in one molecule.

In the process of the present invention, the polyisocyanate reacts with the polyol and the monofunctional blocking agent at a desired ratio to remain free isocyanate groups in the resulting intermediate (A). The orders of reacting these compounds are not critical provided that the intermediate (A) has free isocyanate groups.

For example, (a) the polyisocyanate reacts with the polyol and then, the reaction product reacts with the monofunctional blocking agent, or (b) the polyisocyanate reacts with the monofunctional blocking agent and then, the reaction product reacts with the polyol; or (c) the polyisocyanate reacts with the polyol and the monofunctional blocking agent at the same time.

The processes for the reactions will be further illustrated by certain embodiments.

In the first process, more than two equivalents preferably 2-8 equivalents of the polyisocyanate per one equivalent of the polyol (2-8 moles of the isocyanate groups per one mole of hydroxyl group) are used.

The monofunctional blocking agent is used at a ratio of 0.2-0.5 mole to one mole of excess isocyanate groups over the hydroxyl group of the polyol. The polyisocyanate, the polyol and the blocking agent are reacted in a desired order or at the same time.

One embodiment of the reactions is as follows.

The polyisocyanate reacts with the polyol at a ratio of more than 2 equivalents preferably 2-8 equivalents of the polyisocyanate to the polyol, at the reaction temperature of from 10° to 150° C. preferably from 30° to 80° C. until disappearing hydroxyl groups of the polyol.

When the ratio of the polyisocyanate is less than 2 equivalents to the polyol, the number of blocked isocyanate groups formed by the reaction with the blocking agent are not enough whereby a curing of the final product is not satisfactorily accomplished.

On the contrary, when the ratio of the polyisocyanate is more than 8 equivalents to the polyol, the number of blocked isocyanate groups formed by the reaction with the blocking agent is large excess whereby a coated layer of the final product is too hard after curing and it is brittle.

After the reaction of the polyisocyanate and the polyol, the monofunctional blocking agent reacts with the unreacted isocyanate group remained after the reaction of the polyol at a ratio of 0.2-0.5 mole of the monofunctional blocking agent to one mole of isocyanate group at the reaction temperature of from 10° to 150° C., preferably from 30° to 80° C. to completely react the monofunctional blocking agent. In usual, the reaction is accomplished for several hours. When the ratio of the blocking agent is less than 0.2 mole per one mole of the isocyanate groups, the number of blocked isocyanate groups for the curing is not enough whereby the curing is not satisfactorily performed. On the other hand, when it is more than 0.5 mole per one mole of the isocyanate groups, the number of blocked isocyanate groups are large excess than hydroxyl groups in the final product, whereby the mechanical properties of the coated layer after the curing are inferior.

The tertiary amine having at least two hydroxyl groups in one molecule reacts with the isocyanate groups remained after the reaction with the blocking agent as described above, at a ratio of from 1 to 3 mole preferably from 1.1 to 3 moles to one mole of the isocyanate group at the reaction temperature of from 10° to 150° C. preferably from 10° to 80° C. until disappearing the isocyanate groups.

When the ratio of the hydroxyl groups to one mole of the isocyanate groups is less than 1 mole, the reaction product is highly polymerized to cause a gelation. On the other hand, when it is more than 3 mole, large amount of the tertiary amine remains to deteriorate the characteristics of the coated layer.

In the second process, the polyisocyanate and the monofunctional blocking agent are used at a ratio of 2–8 equivalents of the polyisocyanate to the monofunctional blocking agent. The polyol is used at a ratio of 0.2–0.5 mole of hydroxyl group of the polyol to one mole of excess isocyanate group over the monofunctional blocking agent. The polyisocyanate, the polyol and the monofunctional blocking agent are reacted in desired orders or at the same time.

One embodiment of the reactions is as follows.

The polyisocyanate reacts with the blocking agent at a ratio of 2–8 equivalents of the polyisocyanate to the blocking agent. The polyol reacts with the unreacted isocyanate groups at a ratio of 0.2–0.5 mole of hydroxyl groups of the polyol to one mole of the unreacted isocyanate groups. The tertiary amine having at least two hydroxyl groups in one molecule reacts with the unreacted isocyanate groups at a ratio of 1–3 moles preferably 1.1–3 moles of hydroxyl groups of the tertiary amine to one mole of the unreacted isocyanate groups.

The conditions for the reactions are substantially the same with those in the first process.

The ratios of the blocking agent, the polyol and the tertiary amine to the isocyanate groups are decided by substantially the same reasons as in the first process.

The polyisocyanates used for the process of the present invention are aromatic and aliphatic polyisocyanates having two isocyanate groups in one molecule.

Suitable polyisocyanates include aromatic diisocyanates such as 2,4-tolylenediisocyanate, 2,6-tolylenediisocyanate, naphthalene-1,5-diisocyanate, xylylenediisocyanate, 4,4'-diphenylmethane-diisocyanate, 4,4'-diphenyldimethylmethanediisocyanate, di- or tetra-alkyldiphenylmethanediisocyanate, 4,4'-dibenzyldiisocyanate, 1,3-phenylenediisocyanate, and 1,4-phenylenediisocyanate; and chlorinated diisocyanates thereof, brominated diisocyanates thereof, and phosphorus containing diisocyanates thereof; and aliphatic diisocyanates such as tetramethylenediisocyanate, hexamethylenediisocyanate, dicyclohexyldiisocyanate, cyclohexane-1,4-diisocyanate, lysinediisocyanate, isophoronediisocyanate, and ω, ω'-diisocyanatedmethylcyclohexane. It is also possible to use prepolymers having isocyanate groups at both terminals obtained by reacting a diisocyanate with a polyol having preferably a molecular weight of less than 1,000 at a molar ratio of NCO/OH of 1–2. Two or more diisocyanates can be mixed. It is also possible to mix a polymerized polyisocyanate such as dimers and trimers of tolylenediisocyanate; and triisocyanates such as 1,3,5-triisocyanate benzene, 2,4,6-triisocyanate toluene and adduct of tolylenediisocyanate with trimethylolpropane and adducts of hexamethylenediisocyanate with water.

The polyols used for reacting with the polyisocyanate in the process of the present invention can be the known polyhydroxyl compounds having a molecular weight of 50–10,000 which are usually used for productions of polyurethanes.

Suitable polyols include low molecular weight glycols, polyethers, polyesters, polyacetals, polythioethers, polybutadieneglycols, silicon-containing polyols and phosphorus-containing polyols.

Suitable low molecular weight glycols include ethyleneglycol, diethyleneglycol, triethyleneglycol, propyleneglycol, dipropyleneglycol, 1,3-butanediol, 1,4-butanediol, pentaethyleneglycol, hexamethyleneglycol, neopentyglycol, 2-ethyl-1.3-hexanediol, N-alkyldiethanolamine and bisphenol A.

It is possible to mix a diol having carboxyl group such as diphenolic acid.

Suitable polyethers include polymers or copolymers of ethyleneoxide, propyleneoxide or tetrahydrofuran. It is also possible to use polyethers obtained by a condensation of the low molecular glycol or mixed ethers or adducts of polyethyleneoxide or polypropyleneoxide with the polyethers.

Suitable polythioethers include thioglycol itself or condensation products of thioglycol with the other glycol.

Suitable polyacetals include water insoluble type polyacetals obtained by reacting 1,4-butanediol with formaldehyde or by reacting 4,4-dioxyethoxydiphenyldimethylmethane with formaldehyde.

Suitable polyesters include polyester glycols obtained by condensing the low molecular weight glycol with a dibasic acid; and polyester glycols obtained by a ring cleavage polymerization of a cyclic ester. These compounds are typical polyols.

It is possible to mix a polyol having three or more functional groups with said polyol.

The monofunctional blocking agents used in the process of the present invention are compounds having one active hydrogen measured by Zerewitinoff method.

Suitable monofunctional blocking agents include sulfites such as acid potassium sulfite and acid sodium sulfite;

secondary amines such as diethylamine, dibutylamine, diphenylamine, butylphenylamine and phenylnaphthylamine;

lower aliphatic alcohols such as methanol, ethanol, chloroethyl alcohol, propanol, butanol, amyl alcohol, hexyl alcohol, heptyl alcohol, octyl alcohol, nonyl alcohol, decyl alcohol and lauryl alcohol;

alicylic alcohols such as cyclopentanol, and cyclohexanol;

aromatic alkyl alcohols such as phenyl carbinol and methylphenyl carbinol;

alkyleneglycol monoalkyl or aryl ether such as ethyleneglycol monomethyl ether, ethyleneglycol monoethyl ether, ethyleneglycol monobutyl ether, ethyleneglycol monoamyl ether, ethyleneglycol monohexyl ether, ethyleneglycol monophenyl ether, diethyleneglycol monomethyl ether and diethyleneglycol monobutyl ether; phenols such as phenol, o-cresol, p-cresol, m-cresol, tert-butylphenol, p-ethylphenol, o-isopropylphenol, p-nitrophenol and p-chlorophenol;

monofunctional alcohols having tert-amino group such as dimethyl ethanolamine, diethyl ethanolamine, N,N,N'-trimethyl-N'-hydroxyethylethylenediamine, N-alkyl-N'-hydroxyethylpiperazine and N-alkyl-N'-hydroxyisopropylpiperazine;

oximes such as acetoxime, methylethyl ketoxime and cyclohexanone oxime; lactams such as ε-caprolactam, γ-butyrolactam δ-valerolactam, and pyrrolidone;

imides such as succinic imide and maleic imide;

imidazoles such as imidazole and 2-ethylimidazole; and active methylene compounds such as dimethyl malonate, diethyl malonate, methyl acetoacetate, and ethyl acetoacetate.

The tertiary amines having at least two hydroxyl groups in one molecule are used in the process of the present invention.

Suitable tertiary amines having at least two hydroxyl groups include N-methyl diethanolamine, N-ethyl diethanolamine, N-butyl diethanolamine, N-oleyl diethanolamine, N-cyclohexyl diethanolamine, N-methyl diisopropanolamine, N-cyclohexyl diisopropanolamine, N,N-dioxyethyl-aniline, N,N-dioxyethyl-m-toluidine, N,N-dioxyethyl-p-toluidine, N,N-dioxypropyl-naphthylamine, N,N-tetraoxyethyl-α-aminopyridine, dioxyethyl piperazine, polyethoxy butyl diethanolamine, polypropoxy methyl diethanolamine, polyesters having tertiary amino group, N,N'-dimethyl N.N'-bisoxypropyl ethylenediamine, N,N'-dimethyl N,N-bisoxyethyl ethylenediamine, triethanolamine, triisopropanolamine, N-alkyl N,N',N'-trisoxyethyl ethylenediamine, N-alkyl N,N',N'-trisoxypropyl ethylenediamine N,N,N',N'-tetraoxyethyl ethylenediamine, N,N,N',N'-tetroxypropyl ethylenediamine and adducts of secondary amine and epoxy compound.

One or more amines can be used.

It is preferable to use a tertiary amine having more than 2.3 preferably more than 2.5 of an average number of hydroxyl groups.

The cationic electrodeposition-coating resin of the present invention is usually used in a form of a salt obtained by reacting an acid with the resin obtained by said reactions.

An organic or inorganic acid is added to the resin obtained by reacting the polyisocyanate, the polyol, the blocking agent and the tertiary amine and then, water is added to the product with stirring to obtain a stable aqueous solution or an aqueous slurry.

Suitable acids include organic acids such as formic acid, acetic acid, propionic acid, lactic acid and citric acid and inorganic acids such as hydrochloric acid, sulfuric acid and phosphoric acid.

The amount of the acid is usually in a range of 0.2–1.5 equivalent, preferably 0.3–1.0 equivalent per one mole of the tertiary amino groups.

When the amount of the acid is less than 0.2 equivalent, water solubility of the resin is inferior whereas when it is more than 1.5 equivalent, disadvantageous phenomena such as a disolution of the electrodeposited layer and an increase of generation of hydrogen gas at a cathode are caused.

The aqueous solution or slurry obtained by said reactions is used for depositing an electrodeposition coated layer on a substrate by a cationic electrodeposition.

It is possible to prepare a coating composition by incorporating desired additives such as a pigment, an antioxidant, a surfactant, a coupling solvent, a curing catalyst and a crosslinking agent which are used in the conventional electrodeposition into the aqueous solution or slurry.

Suitable pigments include iron oxides, lead oxides, carbon black, strontium chromate, titanium dioxide, talc, clay and like.

The curing catalyst is preferably a urethane forming catalyst such as tin compounds.

The electrodeposition is to deposite an electrodeposition coated layer on a cathode by feeding current between a cathode and an anode in an electrodeposition bath of the aqueous composition.

The condition in the electrodeposition can be the same with the electrodeposition using the other type aqueous compositions. It is possible to apply from low voltage to high voltage and usually from 50 to 500 volts. The temperature of the electrodeposition bath is ranging from 10° to 70° C. preferably from 10° to 35° C.

After the electrodeposition, the electrodeposition coated layer is washed with water and is cured in a known curing oven or by an infrared heating lamp at the temperature from 80° to 250° C., preferably 120° to 200° C.

The resins prepared by the process of the present invention can be coated on desired electroconductive substrates especially substrates made of iron, aluminum, copper or like.

The present invention will be further illustrated by certain examples and references which are provided for purposes of illustration only and are not intended to be limiting the present invention.

In the examples, the salt spray test and the moisture resistant test as the tests for coated layers are as follows.

SALT SPRAY TEST

The test was carried out in accordance with Rule for coated layer for parts of automobile (Japanese Industrial standard D0202, 8.3 Anticorrosion test). Each test plate was sampled after spraying a salt solution for each specified time, and washed with water and dried at room temperature for 2 hours. A peel test was carried out by using a cellophane adhesive tape having a width of 24 mm. The result is shown by a time to reach a peel-off or to reach a rust for 3 mm from each scratch mark in one side (total 6 mm for both sides).

MOISTURE RESISTANT TEST

The test was carried out in accordance with Japanese Industrial Standard D 0202.84 at 70°±3° C. and 98±2%. Each test plate was sampled after keeping it under the above test condition for the specified time and washed with water and dried at room temperature for 2 hours.

The cross cut test (according to Japanese Industrial Standard D 0202, 8.11 Adhesion test) was carried out. The result is shown by a time for preventing peel off of the coated layer in the peel test with a cellophane adhesive tape.

EXAMPLE 1

In a 1 liter four necked flask equipped with a thermometer, a stirrer, a dropping funnel, and a condenser with a drying tube, 174 g (2 equivalents) of a mixture of 90% of 2,4-tolylenediisocyanate and 10% 2,6-tolylenediisocyanate (hereinafter referring to as 90/10 TDI) was charged and stirred at the inner temperature of 60° C.

A solution of 100 g (½ equivalent) of polypropyleneglycol (M.W. 400) in 148 g of acetone was added dropwise through the dropping funnel into the mixture. After the addition, the reaction was continued at 60° C. for 3 hours. A solution of 47 g (½ equivalent) of phenol in 25 g of acetone was added dropwise to the reaction mixture at 60° C. for 3 hours. After the addition, the reaction was continued at 60° C. for 1 hour. The reaction mixture was added dropwise into a solution of 75 g (3/2 equivalents) of triethanolamine in 40 g of acetone at room temperature. After the addition, the reaction was continued at 40° C. for 2 hours and at 50° C. for 1 hour to obtain a final product (I).

The resulting resin solution (I) was used for the following composition for the electrodeposition and the following electrodeposition was carried out.

The following components were blended to prepare a pigment paste.

| Component | Amount (wt.part) |
|---|---|
| Resin solution (I) | 83 |
| TiO₂ | 28 |
| Kaolin | 65 |
| Carbon black | 2 |
| Ethyleneglycol monoethyl ether | 54 |

The resulting paste is referred to Paste (II).

The composition for electrodeposition was prepared by blending the following components.

| Component | Amount(wt.part) |
|---|---|
| Paste (II) | 122 |
| Resin soluton (I) | 359 |
| Acetic acid | 15 |
| Deionized water | 1580 |

Each electrodeposition was carried out by using the composition for electrodeposition and an anode of carbon graphite plate and a cathode of a bare steel plate treated with zinc phosphate (150×70×0.8 mm; Bt-37 manufactured by Nihon Test Pannel K.K.) or a non-treated bare steel plate. The coated layer was deposited on the cathode. The conditions for the electrodeposition were a bath temperature of 30° C., pH of 4.6, an application voltage of 220 V, a current feeding time of 3 minutes. After the electrodeposition, the coated layer was washed with a deionized water for several times and then, was cured at 170° C. for 30 minutes to give a thickness of the coated layer of about 20μ.

The coated layer was tested by a salt spray test. The result is shown in Table 1.

EXAMPLE 2

In the apparatus of Example 1, a solution of 47 g (½ equivalent) of phenol in 119 g of acetone was added dropwise to 174 g (2 equivalents) of 90/10 TDI at 60° C. for 3 hours. After the addition, the reaction was continued at 60° C. for 1 hour. A solution of 100 g (½ equivalent) of polypropyleneglycol (MW 400) in 54 g of acetone was added dropwise to the reaction mixture at 60° C. After the addition, the reaction was continued at 60° C. for 3 hours. The reaction mixture was added dropwise to a solution of 75 g (3/2 equivalents) of triethanolamine in 40 g of acetone through the dropping funnel at room temperature. After the addition, the reaction was continued at 40° C. for 2 hours and at 50° C. for 1 hour to obtain a final product.

In accordance with the process of Example 1, except using the final product, a composition for electrodeposition was prepared and an electrodeposition and a curing were carried out. The characteristics of the coated layer are shown in Table 1.

EXAMPLE 3

In accordance with the process of Example 1 except varying condition and components as follows, a resin solution was prepared.

(i) Reaction of polyol with polyisocyanate

| | |
|---|---|
| 4,4'-diphenylmethanediisocyanate | 250 g (2 equivalents) |
| Polyoxytetramethyleneglycol (MW:650) | 130 g (0.4 equivalent) |
| Ethyleneglycol monoethyl ether acetate | 205 g |
| Reaction temperature: | 60° C. |
| Reaction time: | 5 hours |

(ii) Reaction with blocking agent

A solution of the following components were added dropwise to all of the reaction mixture of the reaction (i) to react them.

| | |
|---|---|
| 2-Ethylhexanol | 78 g (0.6 equivalent) |
| Ethyleneglycol monoethylether acetate | 42 g |
| Reaction temperature: | 60° C. |
| Reaction time: | 3 hours |

(iii) Reaction with tertiary amine

All of the reaction mixture of the reaction (ii) was added dropwise to tertiary amine solution of the following components to react them.

| | |
|---|---|
| N,N,N',N'-tetraoxyisopropyl ethylenediamine (M.W. 290 OH equivalent: 73 Adeca quodolol: manufactured by Asahi Denka K.K. | 73 g |
| Triethanolamine | 99 g |
| Ethyleneglycol monoethylether acetate | 93 g |
| Reaction temperature: | 40° C. |
| Reaction time: | 4 hours. |
| The reaction product is referred to Reaction Product (III). | |

In accordance with the process of Example 1, except the following conditions, a pigment paste and a composition for electrodeposition were prepared and an electrodeposition and a curing and a salt spray test were carried out. The result is shown in Table 1.

Preparation of Pigment Paste

| Component | Amount (wt.part) |
|---|---|
| Resin solution (III) | 83 |
| TiO₂ | 28 |
| Kaolin | 65 |
| Carbon black | 2 |
| Ethyleneglycol monoethyl | |

-continued

| Component | Amount (wt.part) |
|---|---|
| ether | 54 |

The resulting pigment paste is referred to pigment paste (IV).

Composition for electrodeposition

| Component | Amount (wt.part) |
|---|---|
| Pigment paste (IV) | 122 |
| Resin solution (III) | 359 |
| Dibutyl tin dilaurate | 4 |
| Lactic acid | 21 |
| Deionized water | 1580 |

Condition for electrodeposition

| | |
|---|---|
| Bath temperature: | 30° C. |
| pH: | 5.2 |
| Voltage: | 250 V |
| Electrodeposition time: | 3 minutes |
| Test panel: | Bare steel treated with zinc-phosphate (Bt-37) and non-treated bare steel |
| Curing temperature: | 190° C. |
| Curing time: | 20 minutes |
| Tickness of coated layer: | about 20μ. |

The result of the salt spray test is shown in Table 1.

EXAMPLE 4

In accordance with the process of Example 1 except the following conditions, a resin solution was prepared.

(i) Reaction of polyisocyanate with polyol

| | |
|---|---|
| Isophoronediisocyanate | 223 g (2 equivalents) |
| Polypropyleneglycol (M.W.:400) | 134 g (⅔ equivalent) |
| 4-methoxy-4-methylpentanone-2 | 192 g |
| Dibutyl tin dilaurate | 1 g |
| Reaction temperature: | 90° C. |
| Reaction time: | 4 hours |

(ii) Reaction with blocking agent

A solution of the following components was added dropwise to all of the reaction mixture of the reaction (i) to react them.

| | |
|---|---|
| Methyl ethylketoxime | 29 g (⅓ equivalent) |
| 4-methoxy-4-methyl pentanone-2 | 16 g |
| Reaction temperature: | 60° C. |
| Reaction time: | 4 hours. |

(iii) Reaction with tertiary amine

All of the reaction mixture of the reaction (ii) was added dropwise to a tertiary amine solution of the following components to react them.

| | |
|---|---|
| N,N-dimethyl N'N'-bisoxyethyl ethylenediamine | 88 g (1 equivalent) |
| Triethanolamine | 49 g (1 equivalent) |
| Dibutyl tin oxide | 1 g |
| 4-methoxy-4-methylpentanone-2 | 74 g |

-continued

| | |
|---|---|
| Reaction temperature: | 40° C. |
| Reaction time: | 5 hours |

The reaction product is referred to Reaction Product (V).

In accordance with the process of Example 3, except using the Reaction Product (V), a composition for electrodeposition was prepared.

The composition was used for an electrodeposition coating under the following conditions.

| | |
|---|---|
| Bath temperature: | 30° C. |
| pH: | 5.5 |
| Voltage: | 200 V |
| Time for electrodeposition: | 3 minutes |
| Test panel: | Non-treated bare steel Bare steel treated with zinc phosphate (Bt-37) |
| Curing temperatue: | 200° C. |
| Curing time: | 20 minutes |
| Tickness of coated layer: | about 20μ. |

The results of the salt spray test, the moisture resistant test and the appearance test are shown in Table 1.

EXAMPLE 5

In accordance with the process of Example 2, except the following conditions, a resin solution was prepared.

(i) Reaction of polyisocyanate with blocking agent

| | |
|---|---|
| 2,4-Tolylenediisocyanate | 174 g (2 equivalents) |
| Ethyleneglycol monobutyl ether | 59 g (½ equivalent) |
| Dioxane | 125 g |
| Reaction temperature: | 60° C. |
| Reaction time: | 5 hours |

(ii) Reaction with polyol

A solution of the following components was added dropwise to all of the reaction mixture of the reaction (i) to react them.

| | |
|---|---|
| Hexamethyleneglycol | 14.8 g (¼ equivalent) |
| Polycaprolactoneglycol (M.W.:540) | 67.5 g (¼ equivalent) |
| Dioxane | 44.3 g |
| Reaction temperature: | 60° C. |
| Reaction time: | 5 hours |

(iii) Reaction with tertiary amine

All of the reaction mixture of the reaction (ii) was added dropwise to a tertiary amine solution of the following components.

| | |
|---|---|
| Adduct of trimethylolpropane-triglycidyl ether and diethylamine | 64 g (0.3 equivalent) |
| ( Eoxy equivalent of trimethylolpropane triglycidyl ether: | 141 ) |
| ( OH equivalent of adduct: | 214 ) |
| Triethanolamine | 60 g (1.2 equivalents) |
| Dioxane | 67 g |
| Reaction temperature: | 40° C. |
| Reaction time: | 5 hours |

The reaction product is referred to Reaction Product (VI).

In accordance with the process of Example 1 except using Reaction Product (VI), a composition for electrodeposition was prepared.

The composition was used for an electrodeposition coating under the following conditions.

| Bath temperature: | 25° C. |
|---|---|
| pH: | 5.4 |
| Voltage: | 220 V |
| Time for electrodepositions: | 3 minutes |
| Test panel: | Non-treated bare steel |
| | Bare steel treated with |
| | zinc phosphate (Bt-37). |
| Curing temperature: | 190° C. |
| Curing time: | 20 minutes |

The results of the salt spray test, the moisture resistant test and the appearance test are shown in Table 1.

TABLE 1

| | Test results | | | | |
|---|---|---|---|---|---|
| Example | 1 | 2 | 3 | 4 | 5 |
| Salt spray test (hour) | | | | | |
| Non-treated bare steel plate | 168 | 168 | 240 | 192 | 240 |
| bare steel plate treated with zinc phosphate (Bt-37) | >480 | >480 | >600 | >528 | >552 |
| Moisture resistant test (hour) | | | | | |
| Bare steel plate treated with zinc phosphate (Bt-37) | >72 | >72 | >72 | >72 | >72 |
| Appearance | | | | | |
| Crater, pine hole | none | none | none | none | none |

What is claimed is:

1. A process for preparing a cationic electrodeposition-coating resin, which comprises:

reacting a polyisocyanate with a polyol and a monofunctional blocking agent in relative amounts such that the molar quantity of isocyanate groups of polyisocyanate is in excess of the total molar amount of hydroxyl groups in said polyol and reactive functional groups in said monofunctional blocking agent thereby synthesizing an intermediate which contains said excess of isocyanate groups;

reacting a tertiary amine having at least two hydroxyl groups with said intermediate in amounts such that there is at least a 1:1 molar correspondance of hydroxyl groups relative to the free isocyanate groups in said intermediate; and reacting the tertiary amine groups in the reaction product of said intermediate and said tertiary amine with an acid to form amine salt groups.

2. The process of claim 1, wherein the quantity of said tertiary amine reacted with said intermediate is such that the molar ratio of the hydroxyl groups of said tertiary amine relative to the excess isocyanate groups of said intermediate ranges from 1 to 3:1.

3. The process of claim 1 or 2, wherein said intermediate is formed by reacting said polyisocyanate with said polyol and said monofunctional blocking agent in amounts of 2 to 8 equivalents of said polyisocyanate per equivalent of said polyol and from 0.2 to 0.5 mole of said monofunctional blocking agent per mole of the isocyanate groups not reacting with said polyol.

4. The process of claim 1 or 2, wherein said intermediate is formed by reacting said polyisocyanate with said polyol and said monofunctional blocking agent in amounts of 2 to 8 equivalents of said polyisocyanate per equivalent of said monofunctional blocking agent and from 0.2 to 0.5 mole of hydroxyl groups of said polyol per mole of the isocyanate groups not reacting with said monofunctional blocking agent.

5. The process of claim 1 or 2, wherein said intermediate is formed by reacting said polyisocyanate with said polyol in amounts of 2 to 8 equivalents of said polyisocyanate per equivalent of said polyol, and then reacting said monofunctional blocking agent with the product of the reaction between said polyisocyanate and said polyol in amounts ranging from 0.2 to 0.5 mole of the monofunctional blocking agent per mole of the free isocyanate groups in the reaction product between said polyisocyanate and said polyol.

6. The process of claim 1 or 2, wherein said intermediate is formed by reacting said polyisocyanate with said monofunctional blocking agent in amounts from 2 to 8 equivalents of said polyisocyanate to the monofunctional blocking agent, and then reacting said polyol with the reaction product of said polyisocyanate with said monofunctional blocking agent in amounts of from 0.2 to 0.5 mole of hydroxyl groups of the polyol per mole of the free isocyanate groups in the reaction product of said polyisocyanate with said monofunctional blocking agent.

7. The cationic electrodeposition resin coating prepared by the process of claim 1.

8. The process of claim 1, wherein the quantity of said tertiary amine reacted with said intermediate is such that the molar ratio of the hydroxyl groups of said tertiary amine relative to the free isocyanate groups in said intermediate ranges from 1.1 to 3:1.

9. The process of claim 1, wherein said polyol is a low molecular weight glycol, polyether, polyester, polyacetal, polythioether, polybutadieneglycol, silicon containing polyol or phosphorus containing polyol.

10. The process of claim 1, wherein said monofunctional blocking agent is selected from the group consisting of sulfites, secondary amines, aliphatic alcohols, alicyclic alcohols, aromatic alkyl alcohols, alkylene glycol monoalkyl or aryl ethers, phenols, monofunctional alcohols containing a tertiary amino group, oximes, imides, imidazoles and methylene compounds.

11. The process of claim 1, wherein said polyisocyanate is selected from the group consisting of 2,4-tolylenediisocyanate, 2,6-tolylenediisocyanate, naphthalene-1,5-diisocyanate, xylylenediisocyanate, 4,4'-diphenyldimethylmethane-diisocyanate, 4,4'-diphenyldimethylmethanediisocyanate, di- or tetra-alkyldiphenylmethanediisocyanate, 4,4'-dibenzyldiisocyanate, 1,3-phenylenediisocyanate, 1,4-phenylenediisocyanate, chlorinated diisocyanates thereof, brominated diisocyanates thereof, phosphorus containing diisocyanates thereof, an aliphatic diisocyanate, and a prepolymer formed by reacting a diisocyanate with a polyol.

* * * * *